United States Patent [19]

Hashimoto et al.

[11] Patent Number: 6,066,586
[45] Date of Patent: *May 23, 2000

[54] PROCESS OF REGENERATING SOLID CATALYSTS

[75] Inventors: Mitsuo Hashimoto; Jun Uehara, both of Yokohama, Japan

[73] Assignee: Nippon Oil Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/918,708

[22] Filed: Aug. 22, 1997

Related U.S. Application Data

[63] Continuation of application No. 08/621,675, Mar. 27, 1996, abandoned.

[30] Foreign Application Priority Data

Mar. 31, 1995 [JP] Japan ................................ 7-099606

[51] Int. Cl.⁷ .............................. B01J 20/34; B01J 38/04; B01J 38/02
[52] U.S. Cl. ................. 502/34; 502/38; 502/54; 502/56
[58] Field of Search ................. 502/34, 38, 54, 502/56

[56] References Cited

U.S. PATENT DOCUMENTS

| | | | |
|---|---|---|---|
| 3,536,631 | 10/1970 | Grosspietch et al. | 252/411 |
| 4,477,584 | 10/1984 | Kaeding | 502/77 |
| 4,983,560 | 1/1991 | Copperthwaite et al. | 502/85 |

FOREIGN PATENT DOCUMENTS

| | | | |
|---|---|---|---|
| 0134330 | 3/1985 | European Pat. Off. | |
| 0 134 330 A1 | 8/1985 | European Pat. Off. | B01J 29/28 |

OTHER PUBLICATIONS

Lewis, ed., Hawley's Condensed Chemical Dictionary, 12th ed., pp. 1240–1241 (1993) no month.

B. Douglas, et al. Concepts and Models of Inorganic Chemistry, 3rd ed., pp. 239–240, 244–245, 346 (1994) no month.

D. Considine, ed., Van Nostand's Scientific Encyclopedia, 7th ed., pp.522–526 (1989) no month.

The New Encyclopedia Brittanica, 15th ed. Vol. 1, pp. 173 (1997) no month.

*Primary Examiner*—John F. Niebling
*Assistant Examiner*—Alexander G. Ghyka
*Attorney, Agent, or Firm*—Akin, Gump, Strauss, Hauer & Feld, L.L.P.

[57] ABSTRACT

A process of regenerating catalysts is carried out by removing precipitates of carbonaceous materials from the catalyst. This process comprises contacting a deteriorated catalyst with a nitrogen oxide gas or a nitrogen oxide-containing gas at a temperature ranging between 200° C. and 800° C.

6 Claims, No Drawings

PROCESS OF REGENERATING SOLID CATALYSTS

This application is a continuation of Ser. No. 08/621,675, filed Mar. 27, 1996, now abandoned.

BACKGROUND OF THE INVENTION

1. Field of the Invention

This invention relates to the regeneration of catalysts and more particularly a process of regenerating solid catalysts deposited with carbonaceous precipitates.

2. Prior Art

Solid catalysts used in the various chemical reactions of hydrocarbons undergo deterioration with time and such deterioration is believed to be attributable mainly to deposits of metal impurities contained in the reaction materials and also to deposits of carbonaceous precipitates resulting from hydrocarbon decomposition. The latter deposits are encountered during a variety of catalytic reaction processes employed in the petroleum or petrochemical industry such as catalytic cracking, catalytic reforming, catalytic hydrogenation, catalytic hydrogenative desulfurization, catalytic hydrogenative denitration and the like.

A most usual practice has been to remove precipitates of carbonaceous materials from the catalyst by burning them off by contact with air after the reaction is discontinued in the case where the catalyst is a fixed-bed type, or while the reaction is being carried out as in the case of catalytic cracking or reforming process.

Conventional catalyst regeneration methods using the medium of air for burning deposits of carbonaceous material off the surfaces of deteriorated catalyst may be advantageous in that the catalyst can be regenerated for reuse in a relatively short length of time if the burning is effected at elevated temperatures. However, air burning at increased temperature would often lead to thermal degradation of the catalyst. Conversely, if the burning temperature is lowered, then this will take so much more time and more amounts of air for the catalyst to be adequately regenerated.

SUMMARY OF THE INVENTION

It is therefore a primary object of the present invention to provide a catalyst regeneration process which can be carried out at a selected temperature such that will not adversely affect the catalyst performance and in a relatively short process time, hence with reduced energy consumption.

More specifically, the invention seeks to provide a process of removing carbonaceous deposits from a deteriorated catalyst with use of a nitrogen oxide gas which can be readily reduced to nitrogen without a risk of environmental pollution.

It has now been found that the carbonaceous deposits can be removed from the deteriorated catalyst by contacting it with a nitrogen oxide gas at a temperature below 800° C.

According to the invention, there is provided a process of regenerating solid catalysts which comprises contacting a deteriorated catalyst with a nitrogen oxide gas or a nitrogen oxide-containing gas at a temperature ranging between 200° C. and 800° C.

DETAILED DESCRIPTION OF THE INVENTION

According to the invention, there may be used any nitrogen oxides represented by the general formula NOX such as nitrogen monoxide (NO), nitrous oxide ($N_2O$), nitrogen dioxide ($NO_2$), dinitrogen trioxide ($N_2O_3$) and dinitrogen tetroxide ($N_2O_4$) singly or in combination, among which nitrogen monoxide (NO) is particularly preferred. These nitrogen oxides may be gaseous or liquid at room temperature but are used in a gas phase in the inventive regeneration process. It is possible to use ammonia and hydrazine as the source of nitrogen oxide in view of their ease of convertibility to nitrogen.

The contact gas under consideration may be a nitrogen oxide of 100 percent concentration or a nitrogen oxide-containing gas obtained by diluting the nitrogen oxide gas with an innert gas such as nitrogen, helium and argon, steam, carbon monoxide, carbon dioxide and air. Therefore, there may be advantageously used exhaust gases emanating from heating furnaces or automobile engines.

The nitrogen oxide-containing gas has a nitrogen oxide concentration of more than 100 ppm, preferably more than 500 ppm.

The inventive catalyst regeneration process is carried out at a selected temperature ranging preferably between 200° C. and 800° C., more preferably between 300° C. and 600° C., whereby the nitrogen oxide can be partially or wholly reduced to nitrogen.

The deteriorated solid catalyst may contain from about 1 wt % to about 30 wt % carbonaceous deposits and preferably contains from about 2 wt % to about 25 wt % carbonaceous deposits, based on the weight of the deteriorated catalyst.

The inventive process is applicable to removal of carbonaceous deposits from a variety of solid catalysts. Specific examples of these catalysts include a fluidized catalytic cracking catalyst such as a silica-alumina catalyst, a silica-magnesia catalyst and a zeolite catalyst and a catalytic reforming catalyst such as a catalyst comprising metallic components of platinum or platinum-rhenium supported on a carrier such as alumina or the like.

Furthermore, the inventive process may be applied to the regeneration of a hydrocracking catalyst such as a catalyst comprising metallic components of nickel, molybdenum, tungsten or the like supported on a carrier such as silica-alumina, a hydro-refining, a hydrodesulferization and a hydrodenitration catalysts such as a catalyst comprising metallic components of molybdenum, cobalt or nickel supported on a carrier such as alumina or silica-alumina.

The invention will be further described by way of the following examples.

EXAMPLE 1

3.871 milligrams of a commercially available active carbon were contacted with 200 milliliters per minute of air at a temperature of 500° C. The rate of reduction in the weight of carbon was measured by a thermobalance (produced by Rigaku Denki Co., Ltd.) to read 0.23 milligrams per hour.

EXAMPLE 2

The procedure of Example 1 was followed except that the active carbon was contacted with a mixture of 40 milliliters per minute of a nitrogen gas containing 10% by volume nitrogen monoxide and 160 milliliters per minute of air. The rate of carbon weight reduction was 1.50 milligrams per hour.

COMPARATIVE EXAMPLE 3

23.44 milligrams of a catalyst used for a catalytic reforming reaction with carbonaceous deposits of 6.1 percent by weight were contacted with 200 milliliters per minute of air at a temperature of 500° C. The rate of reduction in the weight of carbon was measured the same manner as in Example 1 to read 1.80 milligrams per minutes.

INVENTIVE EXAMPLE 4

The procedure of Comparative Example 3 was followed except that the catalyst was contacted with a mixture of 40 milliliters per minute of a nitrogen gas containing 10% by volume nitrogen monoxide and 160 milliliters per minute of air. The rate of carbon deposits weight reduction was 2.40 milligram per minute.

INVENTIVE EXAMPLE 5

The procedure of Comparative Example 3 was followed except that the catalyst was contacted with a mixture of 20 milliliters per minute of a nitrogen gas containing 10% by volume nitrogen monoxide and 180 milliliters per minute of air. The rate of reduction in the weight of carbon deposits was 2.10 milligrams per minute.

INVENTIVE EXAMPLES 6–8

The procedure of Inventive Example 4 was followed except for the temperatures at which the catalyst was contacted with the mixture of the nitrogen gas and air. Table 1 below shows the rate of carbon deposits weight reduction.

TABLE 1

| Inventive Examples | temperature (° C.) | catalyst weight (mg) | rate of carbon deposits weight reduction (mg/min) |
|---|---|---|---|
| 6 | 350 | 21.35 | 0.13 |
| 7 | 400 | 21.44 | 0.70 |
| 8 | 450 | 24.12 | 1.56 |

COMPARATIVE EXAMPLES 9–11

The procedure of Comparative Example 3 was followed except that the temperatures at which the catalyst was contacted with air. Table 2 shows the rate of carbon deposits weight reduction.

TABLE 2

| Comparative Examples | temperature (° C.) | catalyst weight (mg) | rate of carbon deposits weight reduction (mg/min) |
|---|---|---|---|
| 9 | 350 | 21.35 | 0.09 |
| 10 | 400 | 21.44 | 0.54 |
| 11 | 450 | 24.12 | 0.94 |

COMPARATIVE EXAMPLE 12

20.51 milligrams of a catalyst used for a fluidized catalytic cracking reaction with carbonaceous deposits of 3.2 percent by weight were contacted with 200 milliliters per minute of air at a temperature of 500° C. The rate of reduction in the weight of carbon was measured the same manner as in Example 1 to read 1.51 milligrams per minute.

INVENTIVE EXAMPLE 13

The procedure of Comparative Example 12 was followed except that the catalyst was contacted with a mixture of 40 milliliters per minute of a nitrogen gas containing 10% by volume nitrogen monoxide and 160 milliliters per minute of air. The rate of carbon deposits weight reduction was 2.27 milligrams per minute.

COMPARATIVE EXAMPLE 14

21.94 milligrams of a catalyst used for a hydrodesulferization reaction with carbonaceous deposits of 23.3 percent by weight were contacted with 200 milliliters per minute of air at a temperature of 500° C. The rate of reduction in the weight of carbon measured the same manner as in Example 1 to read 1.98 milligrams per minute.

INVENTIVE EXAMPLE 15

The procedure of Comparative Example 14 was followed except that the catalyst was contacted with a mixture of 40 milliliters per minute of a nitrogen gas containing 10% by volume nitrogen monoxide and 160 milliliters per minute of air. The rate of carbon deposits weight reduction was 2.71 milligrams per minute.

What is claimed is:

1. A process of regenerating solid catalysts deteriorated by deposition of carbonaceous materials from hydrocarbon decomposition which consists essentially of contacting a deteriorated catalyst containing carbonaceous deposits in an amount of from about 1 wt % to about 30 wt %, based on the weight of the deteriorated catalyst, with a nitrogen oxide gas other than nitrous oxide or a mixture of an inert gas and a nitrogen oxide-containing gas other than a nitrous oxide-containing gas at a temperature ranging between 200° C. and 800° C., wherein said nitrogen oxide-containing gas has an NOX concentration of at least 100 ppm and said catalyst is selected from the group consisting of hydrocracking catalysts, reforming catalysts, hydrorefining catalysts, hydrodenitration catalysts, hydrodesulfurization catalysts, silica-alumina cracking catalysts and silica-magnesia cracking catalysts.

2. A process according to claim 1 wherein said nitrogen oxide is selected from the group consisting of nitrogen monoxide, nitrogen dioxide, dinitrogen trioxide and dinitrogen tetroxide.

3. A process according to claim 1 wherein said nitrogen oxide-containing gas has a NOX concentration of at least 100 ppm.

4. A process according to claim 1 wherein said nitrogen oxide gas or said nitrogen oxide-containing gas is admixed with a predetermined amount of air.

5. A process according to claim 1 wherein said deteriorated catalyst contains from about 2 wt % to about 25 wt % carbonaceous deposits, based on the weight of the deteriorated catalyst.

6. A process for regenerating solid catalysts deteriorated by deposition of carbonaceous material from hydrocarbon decomposition which consists essentially of contacting a deteriorated catalyst containing carbonaceous deposits in an amount of from about 1 wt % to about 30 wt %, based on the weight of the deteriorated catalyst, with a nitrogen oxide gas other than nitrous oxide or a mixture of an inert gas and a nitrogen oxide-containing gas other than a nitrous oxide-containing gas at a temperature ranging between 200° C. and 800° C., wherein said nitrogen oxide-containing gas has an NOX concentration of at least 100 ppm and said catalyst is selected from the group consisting of hydrocracking catalysts, reforming catalyst, hydrorefining catalysts, hydrodenitration catalysts, hydrodesulfurization catalysts, and cracking catalysts, wherein when said cracking catalysts are zeolites, said zeolites are synthetic zeolites.

* * * * *

UNITED STATES PATENT AND TRADEMARK OFFICE
CERTIFICATE OF CORRECTION

PATENT NO. : 6,066,586
DATED : May 23, 2000
INVENTOR(S) : Mitsuo Hashimoto, et. al.

It is certified that error appears in the above-indentified patent and that said Letters Patent is hereby corrected as shown below:

Title page, item [63], "continuation of" should read --continuation-in-part of --.

Signed and Sealed this

Twentieth Day of March, 2001

Attest:

NICHOLAS P. GODICI

*Attesting Officer*    *Acting Director of the United States Patent and Trademark Office*